United States Patent [19]
Rubis

[11] 3,771,038
[45] Nov. 6, 1973

[54] DRIFT CORRECTING SERVO

[76] Inventor: Casimir Joseph Rubis, Jamestown Road, Davidsonville, Md.

[22] Filed: Nov. 27, 1970

[21] Appl. No.: 93,311

[52] U.S. Cl. ........................ 318/636, 324/130, 330/9
[51] Int. Cl. ........................ G05b 21/02
[58] Field of Search ........................ 318/636; 324/130; 330/9

[56] References Cited

UNITED STATES PATENTS

| | | | |
|---|---|---|---|
| 3,390,302 | 6/1968 | Strathman et al. | 324/130 |
| 3,634,868 | 1/1972 | PeLavin | 330/9 |
| 3,667,041 | 5/1972 | Senour | 334/130 |
| 3,445,839 | 5/1969 | Engelberg et al. | 324/130 |
| 2,713,135 | 7/1955 | Macklem | 318/636 X |
| 2,618,674 | 11/1952 | Stanton | 318/636 X |

*Primary Examiner*—Richard A. Farley
*Attorney*—R. S. Sciascia and Q. E. Hodges

[57] ABSTRACT

This invention is an error correcting circuit to cancel the drift of a drifting electronic or electromechanical system by periodically sampling the output of the drifting electronic or electromechanical system for output signal error due to drift and then introducing a feedback signal to cancel out the drift error thereby providing a corrected output. The invention encompasses a short and a long term memory and functions by periodically setting the drifting electronic or electromechanical system input to zero for a short time sampling interval, sensing the output of the drifting system, developing a feedback correction signal and then adding or subtracting the feedback signal from the drifting system output to effectively cancel out the error portion of the drifting system output signal. The short term memory provides an almost instantaneous feedback correction signal value and very quickly brings the drifting system output to its corrected signal amplitude while simultaneously initiating a change in the output of the long term memory to bring the output of the long term memory into coincidence with the output of the short term memory. The short term memory holds the correction signal after the expiration of the short sampling period, long enough for the long term memory signal output to become equal to the short term memory correction signal. Then the short term memory is taken out of circuit and the stable long term memory signal is introduced to provide the corrected signal for the electronic system over a relatively long time interval, until the next sampling period. Additionally, during the sampling period when the drifting system input is set to zero, a holding circuit having the signal value of the drifting system immediately before the sampling period, is introduced in place of the drifting system and during the sampling period provides an output signal in place of the drifting system.

5 Claims, 3 Drawing Figures

INVENTOR.
CASIMIR J. RUBIS
BY [signature]
ATTORNEY

INVENTOR.
CASIMIR J. RUBIS
BY [signature]
ATTORNEY

DRIFT CORRECTING SERVO

The invention described herein may be manufactured and used by or for the Government of the United States of America for Governmental purposes without the payment of any royalties thereon or therefor.

DESCRIPTION OF THE PRIOR ART

Electronic circuits and servo systems usually have an output drift caused by temperature, component aging or other environmental factors. To design very low drift, high accuracy systems the techniques commonly employed are matched low tolerance components, temperature compensation, or continuous feedback. However, these techniques are costly and require considerable design. In addition, each drift compensation that works is unique, usually not fully effective for all system errors and not broadly applicable to other systems without individual design. Also, in spite of the short term stablization, the error drift may be large enough to be unacceptable where long term stability is required. In addition, sampling techniques used in the prior art introduce many complex feedback loops with the end result that total system stablization is compromised as is the economics of building such compensation systems.

SUMMARY OF THE INVENTION

This invention utilizes a correction circuit which is external to the electronic drifting or electromechanical system to be stablized and which may be disengaged and used with other systems. The correction circuit of this invention cancels system drift by periodically setting the system input to zero for very short time intervals, sampling the electronic system output, and supplying a correction signal through a long term servo memory, until the next sampling time. This invention has three separate subsystems: a holding circuit, a short term fast acquisition memory, and a long term, stable position servo memory. During the sampling time the drifting electronic or electromechanical system input is set to zero. To prevent fluctuations in the system output, a holding circuit is introduced, providing a substitute output signal equal to the value of the drifting system output immediately prior to the sampling time $\tau$. At the end of the sampling time the drifting electronic or electromechanical system output with its input set to zero, is the value of the drift error within the electronic or electromechanical system. This value is integrated by the short term memory to produce a correction signal and directed to a differencer combining the output correction signal with the output of the electronic drifting or electromechanical system. The short term memory output signal is simultaneously directed to the long term position servo memory which comprises a differencing operational amplifier, a motor, gear train and potentiometer. While the short term memory provides a drift compensating voltage almost immediately upon initiation of the sampling time, the short term memory is ineffective for providing the correction signal for the duration of the long period between each sampling time. During the short sampling time the short term memory provides a correction signal to the differencer and holds this signal after the expiration of the sampling time and until the long term position servo memory output responds to and is equal to the short term memory signal output. At the expiration of the sampling time, the output holding circuit is disconnected and the system output is reconnected to the differencer. When the long term memory output equals the short term memory output, the short term memory is disconnectd from the differencer and the long term memory output is connected to the differencer. The drift differencer output is then the corrected output of the drifting electronic or electromechanical system with the drift correction signal supplied by the long term memory.

A pulse output amplifier with an adjustable period and adjustable pulse width sampling time, supplies the timing signals for operation of the electromechanical elements of this device. The sampling period and sampling time is made adjustable for use with various kinds of electronic or electromechanical systems where the sampling period or sampling time may be made necessarily short or long in accordance with utilization needs of the device.

DESCRIPTION OF THE DRAWINGS

As shown in FIG. 1, the correcting system is connected by relay 10 to the drifting system 11 at input terminal 13 and by differencer 29 to its output terminal 15. Terminal 101 of relay 10 is connected to input 13 and terminal 102 is connected to ground and to differencer 17. Differencer 17 takes the difference of the signals appearing on terminal 102 (ground or zero) and the signal appearing on terminal 201 of relay 20. The output of differencer 17 is transmitted to short term memory integrator 19 through charging resistance 18. Integrator 19 comprises the amplifier 21 in parallel with the integrating capacitance 23. The differencer 17 is the input portion of the differential amplifier 21 and is shown separately for illustrative purposes. Relay 60 is used to reset the integrator by discharging the capacitor 23 through resister 25. The output of the short term memory integrator 19 is amplified by inverting unity gain buffer amplifier 27 and appears at terminal 301A of relay contact elements 30A of relay 30. During the sampling time interval $\tau$ and for a short time interval successive to the sampling interval, terminal 303A is connected to 301A and the output of the unity gain buffer amplifier 27 is transmitted to drift differencer 29, which has as its inputs the signal appearing at the output terminal 15 of the drifting system 11 and the signal appearing at the output of buffer amplifier 27. The output of the buffer amplifier 27 is additionally connected to differencer 31 whose output signal is then the difference between the correction signal at the output of amplifier 27 and the output of potentiometer 41, appearing on slider 39 and passed on through the unity gain, non-inverting buffer amplifier 45.

Figure 1:
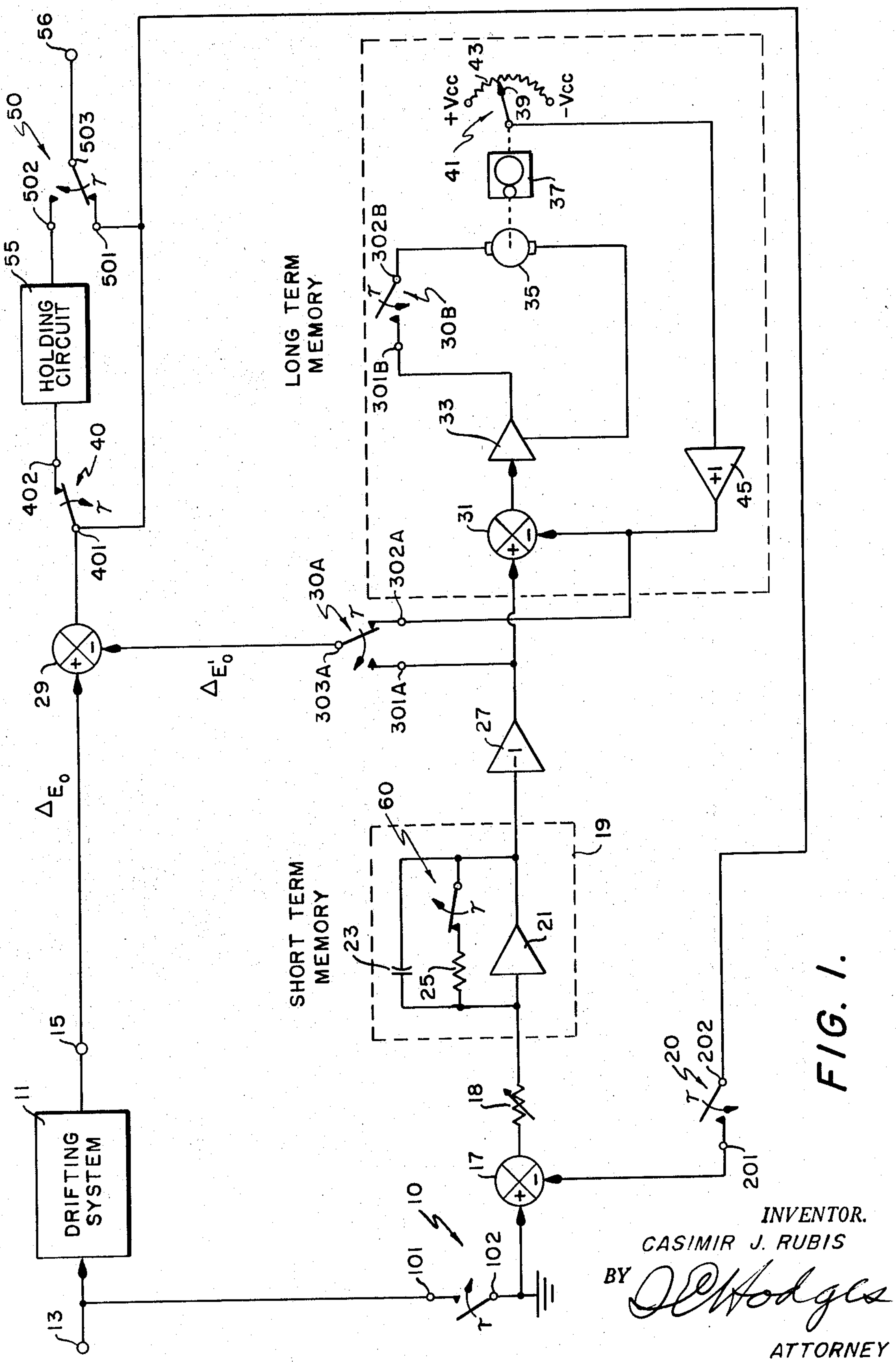
FIG. 1 shows a block diagram of the drift correction servo in operation with an electronic or electromechanical system.

The output of drift differencer 29 is connected by relay terminals 401 of relay 40, and relay terminals 501 of relay 50 to the relay terminal 202 of relay 20 through relay 20 to differencer 17.

The output of the unity gain inverting amplifier 27 is also connected to the long term memory at differencer 31 which has as its second input the feedback signal appearing at sliding contact 39 of potentiometer 41 and fed through the feedback loop unity gain, non-inverting buffer amplifier 45. The signal output of differencer 31 is amplified by operational amplifier 33 and is connected to drive motor 35 through relay contact elements 30B of relay 30. The motor 35 is connected through gear train 37 to potentiometer arm 39 of position potentiometer 41. The resistance element 43 of potentiometer 41 is connected across a voltage regulated power supply +VCC and −VCC and the signal appearing at wiper arm 39 is functionally related to its position on the resistance element 43. The signal at slider 39 is fed through unity gain amplifier 45 and connected to differencer 31 which then takes the difference of the signal appearing at the output of amplifier 27 and the output of amplifier 45. Motor 35 will drive potentiometer 41 until the output at 39, fed through 45 is equal to the short term memory output.

Figure 2:
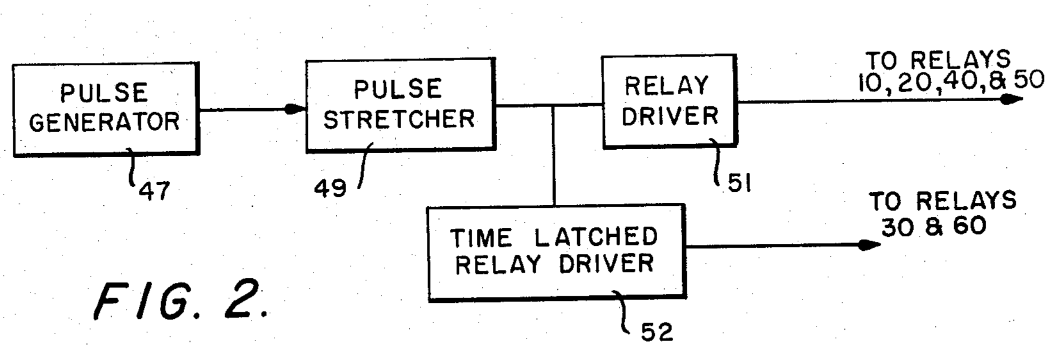
FIG. 2 shows a block diagram of the drift correcting servo enabling system providing a periodic sampling pulse of energy for periodic operation of the drift corrective servo system.

Referring now to FIG. 2, is seen the servo enabling circuit for generating the signals for the control of the relay elements 10, 20, 30, 40, 50 and 60 and comprising a pulse generator 47 having an adjustable period which is the sampling period T. The output of pulse generator 47 is a pulse wave form having the period T. The pulse stretcher 49 is used to create a variable pulse width shown in FIG. 3a, and its output is connected in parallel to relay driver 51 and time latched relay driver 52. The output of relay driver 51 is operatively connected to relays 10, 20, 40, 50, the output of relay driver 52 is connected to relay 30 and 60.

OPERATION OF THE DEVICE

The output of pulse generator 47 is adjusted to provide a recurring wave form as shown in FIG. 3a having a time period T. Pulse stretcher 49, connected to receive the output of pulse generator 47, is adjusted to stretch the width of the pulse generated wave form to a value $\tau$, and the relay driving output signal $E_D$ is the output of pulse stretcher 49 as shown in FIG. 3*a* with a recurring time period T and a pulse width $\tau$ equal to the sampling time. Voltage $E_D$ activates relays 10, 20, 30, 40, 50 and 60 as explained below, in the directions shown by the arrows marked $\tau$ in FIG. 1. At the end of the sampling time $\tau$, relays 10, 20, 40 and 50 return to their original position while relays 30 and 60 remain energized for a short successive time interval.

During the sampling time, the input terminal 13 to the drifting system 11 is set to zero. The drifting system output at terminal 15 after a short time to allow for settling, assumes the off set error voltage $\Delta E_o$ for the balance of the sampling time interval $\tau$ as shown in FIG. 3*c*. The drift error $\Delta E_o$, appearing at the output of differencer 29, approximately at the initiation of the sampling time, is transmitted to the short term memory 19 through the loop comprising relay contacts 401, 501, relay 20, differencer 17 and charging resistance 18. The charging time constant of memory 19 is determined by the value of resistance 18 and capacitance 23. During the sampling time $\tau$, relay 60 is opened and remains open until the timed latch 52 closes relays 60 and 30. When this occurs the output of the integrator is no longer needed and the capacitance 23 is discharged through relay 60 and resistor 25. Ideally, the R–C time constant of resistance 18 and capacitance 23 will be equal to $\tau/8$ or less, where $\tau$ will typically be from 60 milliseconds to one second. To maintain this relationship between the R–C time constant and the sampling time $\tau$, the control for adjustment of the pulse width $\tau$, is ganged to the adjustment control for resistor 18. By varying the width $\tau$ of the pulse, the resistor 18 is directly changed in value so that R–C time constant of 18 in combination with capacitance 23 is substantially equal to $\tau/8$ . After approximately three time constants, the output of short term memory will be substantially the correction voltage $\Delta E'_o$. Although the output of the differencer 29 will be zero, the short term memory 19 will hold the output signal $\Delta E'_o$ for a time interval extending beyond the expiration of the sampling period as the discharge path for the short term memory is now through the high input impedance operational amplifier 27.

During the sampling time $\tau$, the output of amplifier 27 is received by the Long Term Position Servo Memory. Motor 35 is activated by the signal of amplifier 33 whose input is the output of differencer 31. The output of differencer 31 will approach zero when the amplified voltage taken from wiper arm 39, operatively connected to motor 35 through gear train 37, is equal to the voltage $\Delta E'_o$ at the output of amplifier 27. However, as the long term position servo memory requires a period of time longer than $\tau$ for its output to reach the new correction voltage $\Delta E'_o$ , relay 30 and 60 latches for an extended period after the sampling time and is held latched by time latched relay driver 52. For a time interval subsequent to the expiration of the sampling period, the correction voltage $\Delta E'_o$ is supplied by the short term memory servo amplifier 27 and relay contacts 30A. After a sufficient delay allowing the long term memory position servo to achieve its final value, relay driver 52 switches relay 30, opening the motor circuit and changing the source of the correction voltage from amplifier 27 to the output of amplifier 45 in the long term position servo memory circuit. This relay driver also moves relay 60 to the closed position thereby discharging memory capacitor 23.

During the sampling time $\tau$, the relays 40 and 50 disconnect the system output terminal 56 from the drift correcting servo system and connect it to a memory circuit 55 which retains the value of the drift differencer 29 immediately prior to the initiation of the sampling time at $t_0$, and holds this value until the sampling time is over and relays 40 and 50 are operated to reconnect the system output terminal 56 to the output of drift differencer 29. This output memory or short term hold is required to prevent a total signal loss at the output while sampling is taking place.

Figure 3:
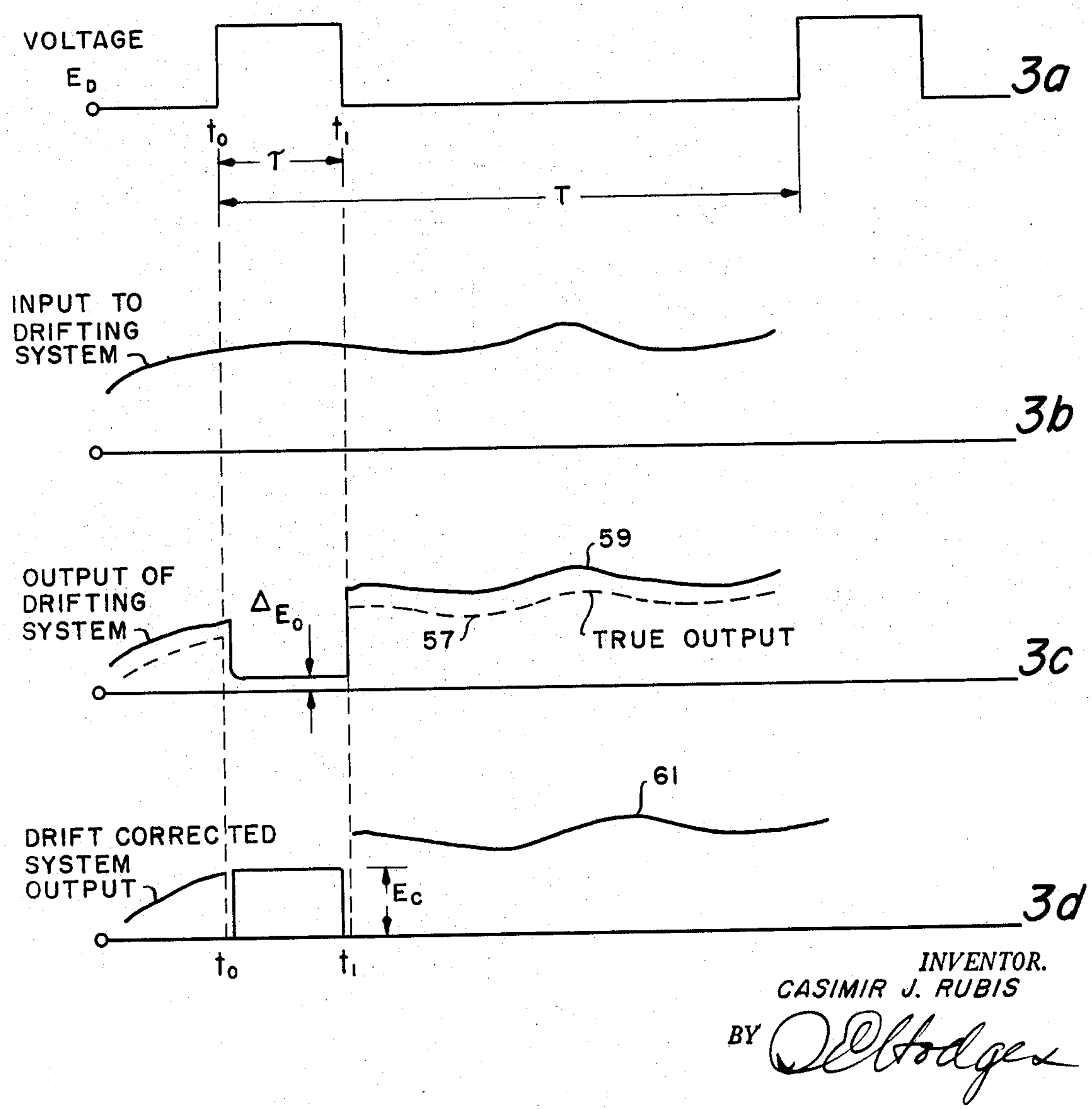
FIG. 3 shows the wave forms of the enabling system of FIG. 2, the input to the drifting system, the output of the drifting system with drift off-set and the corrected output.

As can be seen in FIG. 3, for an input signal to drifting system 11 as shown in FIG. 3*b*, the electronic system output at terminal 15 will comprise a true output 57 and a drift off-set component so that the output of drifting system 11 at terminal 15 will be shown as wave form 59 in FIG. 3*c*, the drift off-set being the difference between the wave form 57 and 59. The corrected output from the drift correcting system will be as shown in FIG. 3*d* wherein 61 is the corrected wave form and $E_c$ and is the holding signal appearing at the system's output terminal 56 and at memory 55 during sampling time $\tau$ from $t_o$ to $t_7$.

To obtain both fast response and good long term stability, requires the use of both short and long term memories since both requirements cannot be met with one type of memory alone.

Although sampling can be accomplished very readily with all transistor electronics, high speed relays are used because of their no voltage off-set capability. Transistor switches have off-set voltages and these off-set voltages are influenced by current, temperature, aging, and variations among individual transistors.

Obviously many modifications and variations of the present invention are possible in the light of the above teachings. It is therefore to be understood that with the scope of the appended claims the invention may be practiced otherwise than as specifically described.

What is claimed is:

1. A system for periodically sampling and correcting the drift error in the output of an electronic or electromechanical system comprising:

a short term memory;

a long term memory;

said short term memory being periodically connected to the output of the drifting system during a predetermined sampling time interval, for generating a correction signal within the sampling time interval;

said long term memory being connected to said short term memory for a period equal to the sampling period combined with an interval of time successive to the sampling period, sufficiently long for the long term memory output to reach the correction signal amplitude of the short term memory;

means to combine the output of the drifting system with the correction signal to produce an electronic system output free of drift;

means to periodically connect the short term memory to the combining means for a first time interval equal to the combined sampling interval and successive time interval and for disconnecting said sampling short term memory and connecting said long term memory to said combining means for a second time interval longer than said first time interval; and means to set the drifting system input to zero during said sampling time interval.

2. The system of claim 1 wherein:

said long term memory comprises a position servo;

said means for connecting comprises a pulse signal generator having an adjustable period and adjustable pulse width;

a first relay connecting the output of the short term memory to the combining means in a first position and the output of the long term memory to the combining means in a second position;

said first relay being operated in the said first position in response to said pulse signal, for the sampling period;

means for holding said first relay in said first position for a time interval successive to the expiration of the sampling interval;

a second relay operated in a first position in response to said pulse signal during the sampling interval, for disconnecting the combining means from the system output and connecting the holding circuit to the system output; and a holding circuit for developing and providing a system output signal equal to the output of the combining means immediately prior to the initiation of the sampling period.

3. The system of claim 2 wherein said short term memory is an integrating operational amplifier having a capacitance feedback path; and said position servo comprises a motor connected by a gear train to a potentiometer for generating the correction voltage.

4. A system for periodically sampling and correcting the drift error in the output of a drifting system, comprising:

a short term memory for providing a correction signal within a sampling interval;

means to combine the output of the drifting system with said correction signal for producing the drift free output signal;

a long term memory;

a timing means;

a first switch responsive to said timing means for setting the input of said drifting system to zero during the sampling time, connecting said short term memory output to the input of said combining means, and connecting said short term memory output to said long term memory input;

said long term memory being responsive to the output of said short term memory for generating a correction voltage equal to the correction voltage of the short term memory;

a holding circuit for developing a voltage equal to the output of the combining means immediately prior to the initiation of the sampling interval;

a second switch responsive to said timing means for disconnecting said holding circuit from the output of the combining means at the initiation of said sampling period, disconnecting the output of the combining means from the system output and connecting the output of the holding circuit to the system output;

said timing means having a periodic pulse wave form;

a timed latch relay driver connected between said timing means and said first switch to hold said short term memory connected to said combining means for a sufficiently long time interval, subsequent to the termination of said sampling time interval, to allow the long term memory output to reach the correction voltage;

said timed latching driver releasing said switch to reconnect the output of the long term memory to the combining means at the expiration of said subsequent time interval; and said second switch disconnecting the holding circuit from the system output and reconnecting the output of the combining means to the system output at the termination of said sampling time in response to said timing means.

5. The system of claim 4 wherein the short term memory is an integrating operational amplifier having a charging time constant less then the sampling period and having a discharging time constant sufficiently large to maintain its output for the time interval of the sampling interval and said successive time interval following the sampling period;

said long term memory comprises a motor and a position transducer;

said position transducer being connected to said motor through a gear train and having an output indicative of the motor position;

said motor being driven in response to the output signal of said short term memory.

* * * * *